United States Patent

Durchschlag

Patent Number: 5,374,016
Date of Patent: Dec. 20, 1994

[54] DEVICE FOR CATCHING WHEEL DEVIATIONS FOR TRACK SWITCHES OR CROSSING HAVING TUBE MOUNTED STRAIN GAUGES FOR MEASURING SENSING HEAD DISPLACEMENT

[75] Inventor: Gerald Durchschlag, Zeltweg, Austria

[73] Assignee: Voest-Alpine Eisenbahnsysteme Aktiengesellschaft, Vienna, Austria

[21] Appl. No.: 77,544

[22] Filed: Jun. 17, 1993

[30] Foreign Application Priority Data

Jun. 17, 1992 [AT] Austria .................. 1238/92

[51] Int. Cl.$^5$ ................................ B61L 1/04
[52] U.S. Cl. .............. 246/270 R; 246/415 R; 246/476
[58] Field of Search ............. 246/270 R, 415 R, 445, 246/476; 73/768, 786, 862.338

[56] References Cited

U.S. PATENT DOCUMENTS

| | | | |
|---|---|---|---|
| 3,300,602 | 1/1967 | Raskin | 246/246 X |
| 4,280,363 | 7/1981 | Johansson | 73/768 |
| 4,526,039 | 7/1985 | Ceccon et al. | 73/786 X |
| 4,530,245 | 7/1985 | Jacobson | 73/768 |

FOREIGN PATENT DOCUMENTS

| | | | |
|---|---|---|---|
| 344145 | 11/1989 | European Pat. Off. | 246/270 R |
| 358625 | 2/1978 | Germany . | |
| 301167 | 12/1988 | Japan | 246/270 R |

Primary Examiner—Robert J. Oberleitner
Assistant Examiner—S. Joseph Morano
Attorney, Agent, or Firm—Cushman, Darby & Cushman

[57] ABSTRACT

This invention relates to a device for determining lateral and/or vertical deviations in the path taken by a wheel at railway points or crossings. One of the aims of this invention is to provide data on the condition of such points or crossings, particularly as to the degree of their wear. Further, it is another aim of the invention to create a device which is easier to relate the signals from the sensors to the direction of the loads giving rise to these signals, and which at the same time is simpler and more economical to assembly while at the same time ensuring reproduceable results. According to this invention, a device for detecting lateral and/or vertical wheel path deviations at railway points or crossings, in which an actuating member (1) of the device works in co-operation with at least one sensor, particularly a resistant strain gauge, characterised in that the actuating member (1) is connected to at least one torsion rod (2), the torsion rod (2) is provided, in a manner known to those versed in the art, with four resistant strain gauges (3) in a circumferentially displaced pattern on its barrel or in a drilled hole, and the torsion rod (2) is disposed in the longitudinal direction of the rails and/or perpendicular thereto.

3 Claims, 2 Drawing Sheets

DEVICE FOR CATCHING WHEEL DEVIATIONS FOR TRACK SWITCHES OR CROSSING HAVING TUBE MOUNTED STRAIN GAUGES FOR MEASURING SENSING HEAD DISPLACEMENT

This invention relates to a device for determining lateral and/or vertical deviations in the path taken by a wheel at railway points or crossings. In this device, an actuating member acts in conjunction with at least one sensor, particularly a resistance strain gauge.

Devices of the above-mentioned type are to be found in, e.g., EP-A-344 145.

Equipment for monitoring the spatial position of switchable rails, such as can be found for example in AT-PS 358 625, is limited to indicating the end position of the switchable rails, for the purpose of giving the all-clear for the track once the indication has been given that the rails are in the correct end position. Devices of this kind are used in remote control equipment and signal boxes.

The device mentioned at the beginning of this specification and described in EP-A-344 145 goes beyond the limitations of such end-position indicators, and aims to provide data on the condition of the points, particularly as to their degree of wear. This device for determining lateral and/or vertical deviations in the path taken by a wheel, disclosed in the citation, is placed in the region of the theoretical nose of the cross frog; and in said prior-art device, the sensor is in the form of a switch and the actuating member is pivoted on an axis essentially perpendicular to the plane of the rail surface, or an axis essentially parallel to the rail surface and running in the direction of the line bisecting the cross frog. Actuation of a such a switch due to deviations from the correct wheel-path, by swivelling of the actuating member about its swivel axis, leads to the production of signals which can subsequently be evaluated, enabling conclusions to be drawn as to the state of wear of safety-critical parts of the points. In this prior-art device, the actuating member of the switch is conical, widening conically from the top edge downwards and from the front end towards the nose of the cross frog. As long as there is no excessive wear, an actuating member of this type will not be touched by either the wheel flanges or the running surfaces of the wheels, and no signal will be issued until a wheel flange or running surface collides with the actuating member. To detect vertical deviations, vertical displacement of the actuating member is also permitted in the above-described device, and a further pressure sensor is also provided for the detection of vertical forces.

A further development of said prior-art device comprises two spring plates or leaves connected to each other at an acute angle, with resistance strain gauges attached to their sides and with a testing head attached to their free end.

All these prior-art devices were relatively expensive to assemble, and the evaluation and calibration of the signals produced by them proved to be relatively expensive. Direct comparability between two such devices was generally not readily possible and therefore expensive calibration of each such device had to be performed individually. In addition to this, it proved relatively difficult, in the evaluation process, to differentiate between horizontal and vertical forces leading to signals.

The aim of the present invention is to create a device, of the type mentioned initially, in which it is easier to relate the signals from the sensors to the direction of the loads giving rise to said signals, and which is simpler and more economical to assemble while at the same time ensuring reproducible results which will provide directly comparable results for a multiplicity of such devices without requiring expensive calibration to achieve this. To achieve this aim, the device according to this invention consists essentially of the following features:

- the actuating member is connected to at least one torsion rod;
- said torsion rod is provided, in a manner known to those skilled in the art, with four resistance strain gauges placed in a circumferentially displaced pattern on its barrel or in a drilled hole; and
- the torsion rod is arranged in the longitudinal direction of the rails and/or perpendicular thereto. By means of this type of sensor arrangement, using a torsion rod, as has already been proposed for rotational position indicators, e.g. in U.S. Pat. No. 4,530,245, a particularly simple and reliable design is achieved in which the arrangement of the resistance strain gauges on the circumference or barrel of such a torsion rod or in a drilled hole in such a torsion rod makes it possible to reliably detect not only rotational forces about the axis of the torsion rod, causing twisting of the rod, but also bending forces causing flexural deformation of the axis of the torsion rod. Thus, a single, simple, compact element—the torsion rod—makes it possible to simultaneously detect a multiaxial load, and to evaluate the individual axial components of this multiaxial load in a simple manner. By means of this small, compact part, i.e. the torsion rod used in accordance with the invention, assembly is not only made considerably simpler, but also comparable results from different devices are ensured without the need for costly calibration work. The torsion rod, which due to the arrangement of the resistance strain gauges constitutes the actual sensor element, can be positioned so as to lie in the longitudinal direction of the rails, whereby lateral deviations of the wheel path act as torsional forces when the actuation member is actuated, and can be evaluated as such. Vertical forces are picked up as bending forces by such a torsion rod, and can be evaluated separately. In addition to or alternatively to such an arrangement of the torsion rod in an essentially horizontal position along the longitudinal direction of the rails, it can also be arranged vertically, at right angles to the longitudinal direction of the rails. Such an arrangement primarily serves for the measurement of bending forces. Such an arrangement also permits signals to be obtained, if desired, for the separate evaluation of the individual directions of the load occurring.

It is advantageous if the invented device is designed in such a way that the resistance strain gauges are arranged at 90° intervals and displaced 45° relative to a vertical plane running in the longitudinal direction of the rails. Such a design provides particularly strong signals for small loadings, with regard to the detection of deviations of the wheel path at points or crossings.

A particularly simple construction and compact design with high operating reliability can be achieved by designing the actuating member as a lever arm connected to the torsion rod, with a testing head on the free end of the lever arm. It is advantageous if the actuating member is in the form of a springy hollow member comprising a base plate connected to the torsion rod and with the actuating member tapering from the base plate to the testing head. Due to the design of the actuating member as a springy hollow body, the impact effect on the testing head is sufficiently reduced so that no plastic deformation of the actuating member can occur.

In order to transmit the force in a definitive manner from the actuating member to the sensor and torsion rod, thereby improving the evaluation by obtaining stronger signals which can be more readily assigned to the individual load components, the design is preferably such that the resistance strain gauges are arranged at places on the circumference of the torsion rod that work in frictional co-operation with ribs or suchlike provided on the actuating member.

A further increase in operating reliability is achieved by attaching the device to the sleeper, ribbed plate, or nose of the cross frog by means of an abutment with a protective projection.

The invention will now be described in greater detail with reference to several examples depicted diagrammatically in the drawings.

Figure 1:
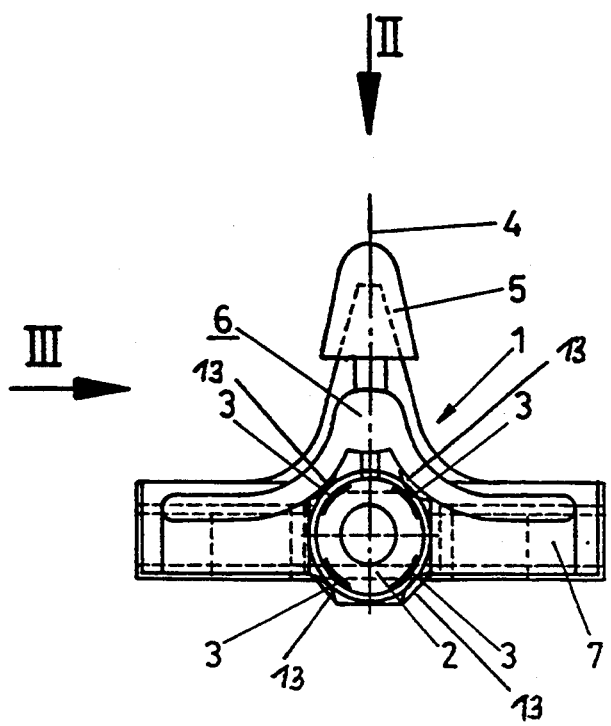
FIG. 1 is a side view of one embodiment of the device according to this invention.
Figure 3:
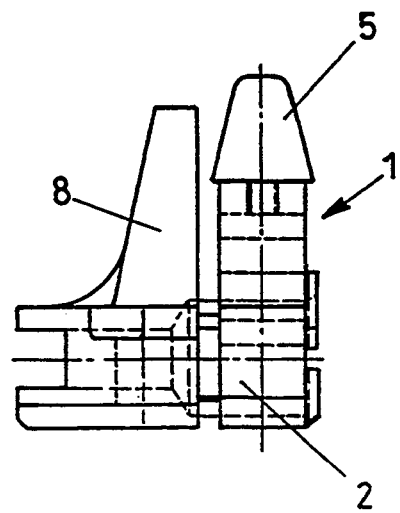
FIG. 3 is a view looking in the direction of arrow III in FIG. 1.
Figure 2:
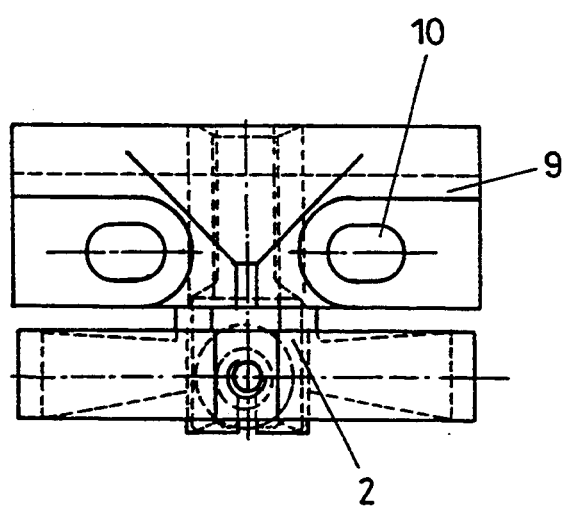
FIG. 2 is a top view, looking down on the device in the direction of arrow II in FIG. 1 (while FIG. 1 is a view looking in the direction of arrow I in FIG. 2)

In the example shown in FIGS. 1 to 3, the numeral 1 indicates the actuating member of a device for the detection of lateral and/or vertical deviations in the wheel path at a set of points or a crossing. The actuating member 1 is connected to a torsion rod 2 in such a way that they turn together. In the example shown, the torsion rod 2 is arranged so as to lie in the longitudinal direction of the rails, and has four resistance strain gauges 3 on its circumference. These resistance strain gauges 3 are arranged with intervals of 90° between one another and at 45° to the vertical plane running through the longitudinal direction of the rails. Said vertical plane is indicated by the dot-and-dash line marked 4.

The actuating member 1 is force-fitted at one end onto the torsion rod 2, and bears on its opposite end a testing head 5. The actuating member 1 is designed as a springy hollow body containing a hollow space 6 shown diagrammatically. The torsion rod 2, together with the resistance strain gauges 3, is arranged in a base plate 7. In the example illustrated, the resistance strain gauges 3 are arranged on the internal circumference of the external barrel of the torsion rod, and the latter, together with the resistance strain gauges 3, forms the sensor. As can be seen in particular in FIG. 3, a protective projection 8 connected to an abutment 9 is also provided, in the direct vicinity of the actuating member 1, and attachment to the nose of a cross frog, or to part of a rail or sleeper, is achieved by means of this abutment 9. Holes 10 are shown for the attachment of the entire unit.

The torsion rod 2 is frictionally connected to the base 7 by means of ribs 13 or suchlike, and these ribs or suchlike function in direct cooperation with the torsion rod 2 in which the resistance strain gauges 3 are arranged.

Figure 4:
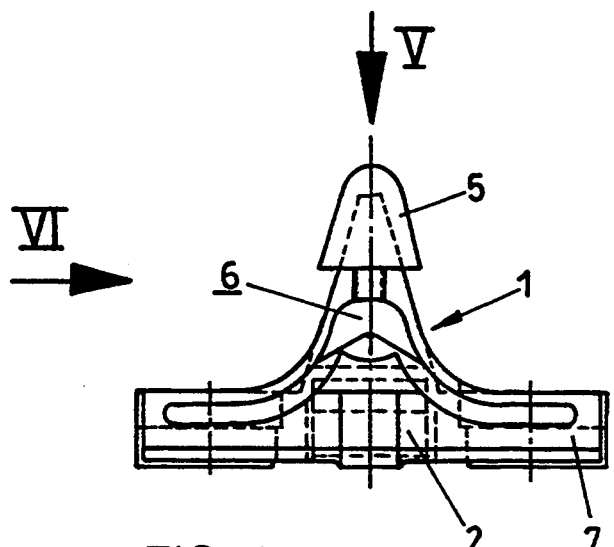
FIG. 4 is a side view of a modified form of the device according to this invention.
Figure 6:
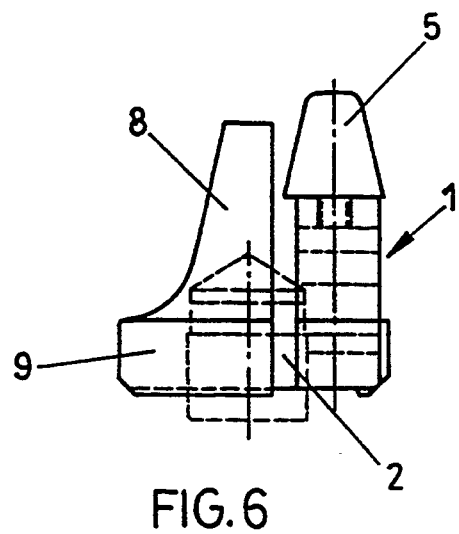
FIG. 6 is a view looking in the direction of arrow VI in FIG. 4.
Figure 5:
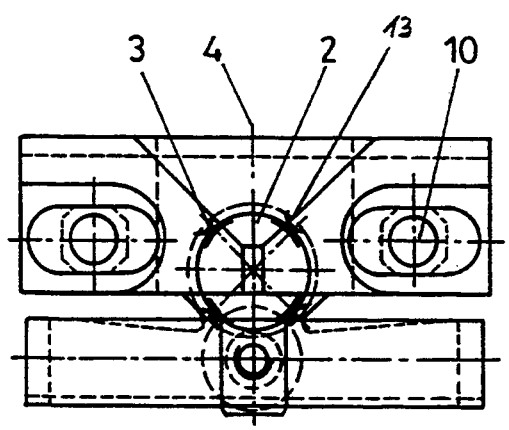
FIG. 5 is a top view corresponding to arrow V in FIG. 4 (while FIG. 4 is a view according to arrow IV in FIG. 5)

In the modified example shown in FIGS. 4 to 6, the same reference numbers are used as for the equivalent components in FIGS. 1 to 3. Again, the actuating member 1 has a testing head 5, but in this example the torsion rod 2 is perpendicular to the longitudinal direction of the rails. The torsion rod 2 again has four resistance strain gauges 3 on it, arranged at 90° intervals to one another and at an angle of 45° to the vertical plane 4 running in the longitudinal direction of the rail.

The actuating member 1 is again in the form of a springy hollow body. Also, the torsion rod 2 is again arranged in the base plate 7 and in the abutment 9 connected to said base plate 7 and bearing a protective projection 8; and the torsion rod 2 is frictionally connected by means of ribs 13 or suchlike to the actuating member 1 and the base 7.

Figure 7:
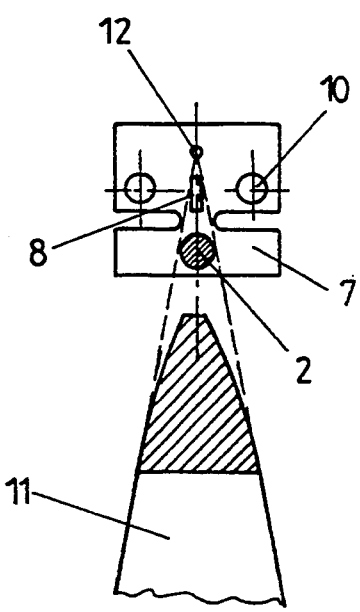
FIG. 7 shows, diagrammatically, the position at which the modified device according to the invention as shown in FIGS. 4 to 6 is attached in the region of a set of points or a crossing.

FIG. 7 shows diagrammatically the position of the device for detecting lateral and/or vertical deviations of a wheel-path at points or crossings. It shows the nose of a cross frog 11, with the device attached in position between the actual nose 11 of the cross frog and its theoretical nose 12 by means of the holes 10. In FIG. 7 the arrangement of the torsion rod 2 according to the example shown in FIG. 4 can be clearly seen, and the protective projection 8 is also indicated.

In conclusion the device, being attached in place by means of the holes 10, can be readily adjusted to fit the circumstances of a given site. Sealing problems are largely eliminated through the use of an enclosed system, namely a torsion rod 2 with resistance strain gauges 3, which together form the sensor unit. By installing and attaching the device in a given position relative to the actual nose of the cross frog and to the corresponding rail parts or parts of the points, it is possible to detect and measure both lateral and vertical deviations of the wheel path, because the introduction of the forces concerned, into the device considered as a whole, occurs directly into the region of the integrated resistance strain gauges 3 on the torsion rod 2, by way of the actuation member 1.

The example shown in FIGS. 1 to 3 can be used in a particularly simple manner for profiled-block frogs, while the example in FIGS. 4 to 6 is particularly suitable for cast frogs.

I claim:

1. A device for detecting wheelpath deviations at railway locations, said device comprising: a flexible hollow body actuator connected at one of its end to a torsion rod and at its opposite end to a testing head, said actuator being tapered towards the testing head and the torsion rod being joined to a base plate; and a plurality of resistance strain gauges supported on a circumferential wall of the torsion rod, said gauges being circumferentially displaced relative to the torsion rod wall at 90° intervals and displaced by 45° relative to a vertical plane running axially of said torsion rod.

2. A device according to claim 1, wherein said torsion rod is arranged in frictional cooperative relationship with members which are joined to said actuator.

3. A device according to claim 1, wherein an abutment having a protective projection for the actuator is joined to the device and is adapted to be secured to said railway.

* * * * *